US008965054B2

(12) United States Patent
Golan et al.

(10) Patent No.: US 8,965,054 B2
(45) Date of Patent: Feb. 24, 2015

(54) METHOD AND SYSTEM FOR EDGE DETECTION

(71) Applicant: Verint Systems Ltd., Herzilya Pituach (IL)

(72) Inventors: Oren Golan, Or-Yehuda (IL); Shmuel Kiro, Rehovot (IL); Itshak Horovitz, Rishon Lezion (IL)

(73) Assignee: Verint Systems Ltd. (IL)

( * ) Notice: Subject to any disclaimer, the term of this patent is extended or adjusted under 35 U.S.C. 154(b) by 0 days.

(21) Appl. No.: 14/145,098

(22) Filed: Dec. 31, 2013

(65) Prior Publication Data

US 2014/0112541 A1    Apr. 24, 2014

Related U.S. Application Data

(63) Continuation of application No. 13/493,408, filed on Jun. 11, 2012, now Pat. No. 8,644,617, which is a continuation of application No. 12/107,976, filed on Apr. 23, 2008, now Pat. No. 8,200,022.

(60) Provisional application No. 61/038,962, filed on Mar. 24, 2008.

(51) Int. Cl.
*G06K 9/00* (2006.01)
*G06K 9/46* (2006.01)
(Continued)

(52) U.S. Cl.
CPC .......... *G06K 9/00362* (2013.01); *G06K 9/4609* (2013.01); *G06K 9/522* (2013.01); *G06K 9/00281* (2013.01); *G06K 9/4604* (2013.01); *G06T 5/00* (2013.01)
USPC ........... 382/103; 382/124; 382/128; 382/154; 382/190; 382/197; 382/219; 382/261; 382/266

(58) Field of Classification Search
CPC . G06K 9/4604; G06K 9/00456; G06K 9/522; G06K 9/3233; G06T 5/00; G06T 7/403; G06T 7/0083; G06T 5/008; G06T 2207/20021; G06T 2207/20192; G06T 7/0085; H04N 1/40068; H04N 5/2357
USPC ......... 382/103, 131, 261, 266, 124, 128, 154, 382/190, 197, 219
See application file for complete search history.

(56) References Cited

U.S. PATENT DOCUMENTS 5,008,752 A * 4/1991 Van Nostrand ............... 348/581
5,488,670 A * 1/1996 Suzuki et al. ................. 382/165
(Continued)

OTHER PUBLICATIONS

Kovesi, P., "image features from phase congruency," Videre: Journal of Computer vision research, Massachusetss Institute of Technology, United States of America, vol. 1, No. 3, Jun. 21, 1999 p. 2-26, XP008060234 ISSN; 1089-2788.*
(Continued)

*Primary Examiner* — Vu Le
*Assistant Examiner* — Aklilu Woldemariam
(74) *Attorney, Agent, or Firm* — Meunier Carlin & Curfman

(57) ABSTRACT

A method executed by a computer system for detecting edges comprises receiving an image comprising a plurality of pixels, determining a phase congruency value for a pixel, where the phase congruency value comprises a plurality of phase congruency components, and determining if the phase congruency value satisfies a phase congruency criteria. If the phase congruency value satisfies the phase congruency criteria, the computer system categorizes the pixel as an edge pixel. If the phase congruency value does not satisfy the phase congruency criteria, the computer system compares a first phase congruency component of the plurality of phase congruency components to a phase congruency component criteria. If the first phase congruency component satisfies the phase congruency component criteria, the computer system categorizes the pixel as an edge pixel, and if the first phase congruency component does not satisfy the phase congruency component criteria, categorizes the pixel as a non-edge pixel.

2 Claims, 8 Drawing Sheets

(51) Int. Cl.
*G06K 9/52* (2006.01)
*G06T 5/00* (2006.01)

(56) References Cited

U.S. PATENT DOCUMENTS

| | | | |
|---|---|---|---|
| 5,563,962 A * | 10/1996 | Peters et al. | 382/261 |
| 5,586,200 A * | 12/1996 | Devaney et al. | 382/232 |
| 5,619,242 A | 4/1997 | Haneda et al. | |
| 5,652,660 A | 7/1997 | Seto et al. | |
| 5,715,334 A * | 2/1998 | Peters | 382/254 |
| 5,734,747 A * | 3/1998 | Vaidyanathan | 382/170 |
| 5,852,475 A * | 12/1998 | Gupta et al. | 348/606 |
| 6,016,206 A * | 1/2000 | Koide et al. | 358/3.02 |
| 6,094,508 A * | 7/2000 | Acharya et al. | 382/199 |
| 6,460,127 B1 * | 10/2002 | Akerib | 712/10 |
| 6,549,658 B1 * | 4/2003 | Schweid et al. | 382/173 |
| 6,704,456 B1 * | 3/2004 | Venable | 382/266 |
| 7,009,623 B2 * | 3/2006 | Xavier | 345/606 |
| 7,227,983 B1 | 6/2007 | Christian et al. | |
| 7,280,704 B2 * | 10/2007 | Peli | 382/260 |
| 7,379,626 B2 | 5/2008 | Lachine et al. | |
| 7,711,148 B2 * | 5/2010 | Slabaugh et al. | 382/103 |
| 8,254,643 B2 * | 8/2012 | Shi et al. | 382/118 |
| 2002/0006221 A1 * | 1/2002 | Shin et al. | 382/181 |
| 2005/0123183 A1 * | 6/2005 | Schleyer et al. | 382/131 |
| 2005/0143655 A1 * | 6/2005 | Satoh | 600/443 |
| 2006/0029284 A1 * | 2/2006 | Stewart | 382/255 |
| 2006/0050783 A1 * | 3/2006 | Le Dinh et al. | 375/240.2 |
| 2007/0070427 A1 * | 3/2007 | Cooper et al. | 358/3.14 |
| 2007/0122025 A1 | 5/2007 | Christian et al. | |
| 2007/0189580 A1 * | 8/2007 | Slabaugh et al. | 382/103 |
| 2007/0248278 A1 * | 10/2007 | Kitamura | 382/266 |
| 2008/0218528 A1 * | 9/2008 | Chang | 345/611 |
| 2009/0102963 A1 * | 4/2009 | Yeo et al. | 348/349 |
| 2009/0208080 A1 * | 8/2009 | Grau et al. | 382/131 |
| 2009/0226033 A1 * | 9/2009 | Sefcik | 382/103 |

OTHER PUBLICATIONS

Kovesi, Peter, "Image Features from Phase Congruency", Videre: Journal of Computer Vision Research, Quarterly Journal, Summer 1999, vol. 1, No. 3, the MIT Press, 27 pages.

Kovesi, Peter, "Image Features from Phase Congruency", Videre: Journal of Computer Vision Research, Massachusetts Institute of Technology, United States of America, vol. 1, No. 3, Jun. 21, 1999, pp. 2-26, XP008060234 ISSN: 1089-2788.

Kovesi, Peter, "Edges Are Not Just Steps", from The University of Western Australia, Department of Computer Science & Software Engineering internet site located at http://www.csse.uwa.edu.au/-pk/research/pkpapers/ACCV62.pdf, retrieved on Jan. 16, 2008, 6 pages.

Kovesi, Peter, "Image Features From Phase Congruency", from The University of Western Australia internet site located at http://citeseer.ist.psu.edu/cache/papers/cs/115/ftp:zSzzSzcs.uwa.edu.auzSzpubzSztechreportszSz95zSz4.pdf/kovesi95image.pdf, retrieved on Jan. 16, 2008, 31 pages.

Koveski, Peter, "Phase Congruency Detects Corners and Edges", from The University of Western Australia-School of Computer Science & Software Engineering internet site located at http://www.csse.uwa.edu.au/-pk/research/pkpapers/phasecorners.pdf, retrieved on Jan. 16, 2008, 10 pages.

Neoh, Hong Shan; Hasanchuk, Asher, "Adaptive Edge Detection for Real-Time Video Processing using FPGAs", from Altera internet site located at http://homepages.inf.ed.ac.uk/rbf/CVonline/LOCAL_COPIES/OWENS/LECT7/node2.html, retrieved on Jan. 16, 2008, 7 pages.

Pelligrino, FA, et al., "Edge Detection Revisited", IEEE Transactions on Systems, Man and Cybernetics, Part B: Cybernetics, IEEE Service Center, Piscataway, New Jersey, United States of America, vol. 34, No. 3, Jun. 1, 2004, pp. 1500-1518, XP011113042, ISSN: 1083-4419.

"Edges: The Canny Edge Detector", located at http://homepages.inf.ed.ac.uk/rbf/CVonline/LOCAL_COPIES/MARBLE/low/edges/canny.htm, retrieved on Apr. 23, 2008, 3 pages.

* cited by examiner

METHOD AND SYSTEM FOR EDGE DETECTION

CROSS-REFERENCE TO RELATED APPLICATIONS

This application is continuation of U.S. application Ser. No. 13/493,408, filed Jun. 11, 2012, which application was published on Sep. 27, 2012, as U.S. Publication No. US20120243793, which application is a continuation of U.S. application Ser. No. 12/107,976, filed Apr. 23, 2008, which application was published on Sep. 24, 2009, as U.S. Publication No. US20090238466, and claims priority to U.S. Provisional Application No. 61/038,962, filed Mar. 24, 2008, the contents of which are incorporated herein by reference in their entireties.

TECHNICAL FIELD

This invention is related to the field of image processing, and more specifically to the process of edge detection within an image processing system.

TECHNICAL BACKGROUND

In image processing, edge detection is often a necessary step in methods for object detection and recognition. For example, many current face detection methods include edge detection as part of their operation. Optimally, an edge detection method would accurately detect every edge in the image, and represent each edge in a line of single pixel width. These characteristics of an edge image improve the accuracy of later image processing steps. Traditional edge detection methods look for abrupt changes in intensity between adjacent or nearby pixels.

In actual operation, a number of difficulties arise when detecting edges within a variety of differing images. For example, some images may contain similar objects that overlap, such as two people wearing similar clothing. Often, images vary greatly in contrast and exposure creating difficult situations where edges are difficult to distinguish. Even within a single edge, within a single image, the color and intensity of the edge may vary due along the edge to the way light and shadow fall on different portions of the edge. All of these problems increase the difficulty of accurately detecting edges in a variety of common situations.

Overview

In an embodiment, a method executed by a computer system for detecting edges comprises receiving an image comprising a plurality of pixels, determining a phase congruency value for a pixel, where the phase congruency value comprises a plurality of phase congruency components, and determining if the phase congruency value satisfies a phase congruency criteria. If the phase congruency value satisfies the phase congruency criteria, the computer system categorizes the pixel as an edge pixel. If the phase congruency value does not satisfy the phase congruency criteria, the computer system compares a first phase congruency component of the plurality of phase congruency components to a phase congruency component criteria. If the first phase congruency component satisfies the phase congruency component criteria, the computer system categorizes the pixel as an edge pixel, and if the first phase congruency component does not satisfy the phase congruency component criteria, categorizes the pixel as a non-edge pixel.

The phase congruency value may comprise a ratio of the plurality of phase congruency components. The first phase congruency component may comprise a local energy of the pixel, while the second phase congruency component may comprise the sum of the amplitudes of the Fourier components of the image at the location of the pixel.

The phase congruency criteria may comprise a phase congruency threshold value, and the phase congruency value satisfies the phase congruency criteria when the phase congruency value exceeds the phase congruency threshold value.

The phase congruency component criteria may comprise a phase congruency component threshold value, and the phase congruency component satisfies the phase congruency component criteria when the phase congruency component exceeds the phase congruency component threshold value.

In some embodiments, the image is a digital image from a transit system, and at least some of the edge pixels and corner pixels define outlines of human heads.

In another embodiment, an image processing system for detecting edges comprises an interface configured to receive images, and a processor electrically coupled with the interface. The processor is configured to receive an image comprising a plurality of pixels through the interface, determine a phase congruency value for a pixel, where the phase congruency value comprises a plurality of phase congruency components, and determine if the phase congruency value satisfies a phase congruency criteria. If the phase congruency value satisfies the phase congruency criteria, the processor categorizes the pixel as an edge pixel. If the phase congruency value does not satisfy the phase congruency criteria, the processor compares a first phase congruency component of the plurality of phase congruency components to a phase congruency component criteria. If the first phase congruency component satisfies the phase congruency component criteria, the processor categorizes the pixel as an edge pixel, and if the first phase congruency component does not satisfy the phase congruency component criteria, categorizes the pixel as a non-edge pixel.

In a further embodiment, a computer-readable medium having instructions stored thereon for operating a computer system to detect edges is described. The instructions, when executed by the computer system, direct the computer system to receive an image comprising a plurality of pixels, determine a phase congruency value for a pixel, where the phase congruency value comprises a plurality of phase congruency components, and determine if the phase congruency value satisfies a phase congruency criteria. If the phase congruency value satisfies the phase congruency criteria, the computer system categorizes the pixel as an edge pixel. If the phase congruency value does not satisfy the phase congruency criteria, the computer system compares a first phase congruency component of the plurality of phase congruency components to a phase congruency component criteria. If the first phase congruency component satisfies the phase congruency component criteria, the computer system categorizes the pixel as an edge pixel, and if the first phase congruency component does not satisfy the phase congruency component criteria, categorizes the pixel as a non-edge pixel.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 1 is a block diagram illustrating an image system for edge detection.

DETAILED DESCRIPTION

As discussed above, edge detection is a difficult task when input images vary greatly in contrast, brightness, or intensity. Even along a single edge, variations in color, contrast, and intensity may result in missed edge pixels, or the inclusion of non-edge pixels in an edge image. In particular, technologies related to the detection of people in still or video images rely upon accurate edge detection in order to reliably process the information in the images and correctly detect and identify individual people.

Figure 1:
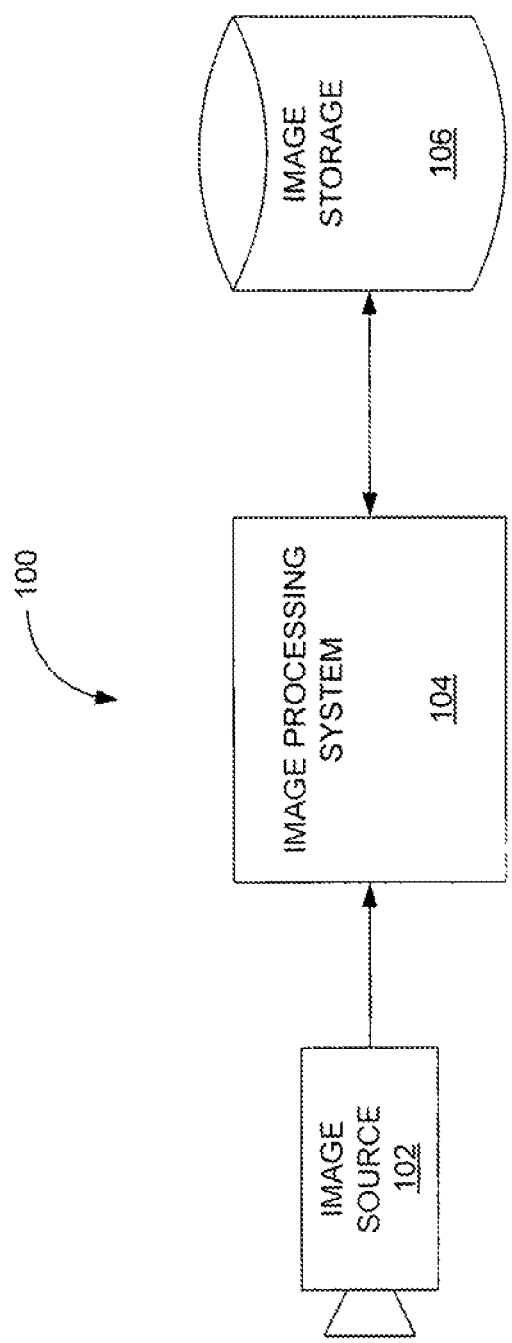

FIG. 1 is a block diagram illustrating an image system 100 for edge detection. In this example image system 100, image processing system 104 is coupled with image source 102 and image storage 106. Images may be captured by any image source 102 capable of generating digital images, such as, digital cameras, video cameras, or other image capture devices.

Image processing system 104 is configured to detect edges of objects within an image from image source 102. For example, it may be desirable to track the quantity, location, and movement of a variety of people within a series of images. In this example, differentiating between different people is a difficult task simplified by detecting the edges of each person. Some embodiments may only examine portions of the people, such as their heads, since these portions may be easier to differentiate than the bodies of people, particularly when the people are wearing similar clothing. One example use of such a method is in a transit system where image processing is used to analyze the movement of people boarding and leaving a vehicle for such purposes as tracking usage of the system throughout a period of time.

Image storage 106 may be any database, memory, disc drive, or other data storage device configured to store images. Image storage 106 may also be configured to store intermediate data resulting from the various methods for edge detection illustrated in FIGS. 2, 5, 6, and 7, and described in detail below.

Figure 2:
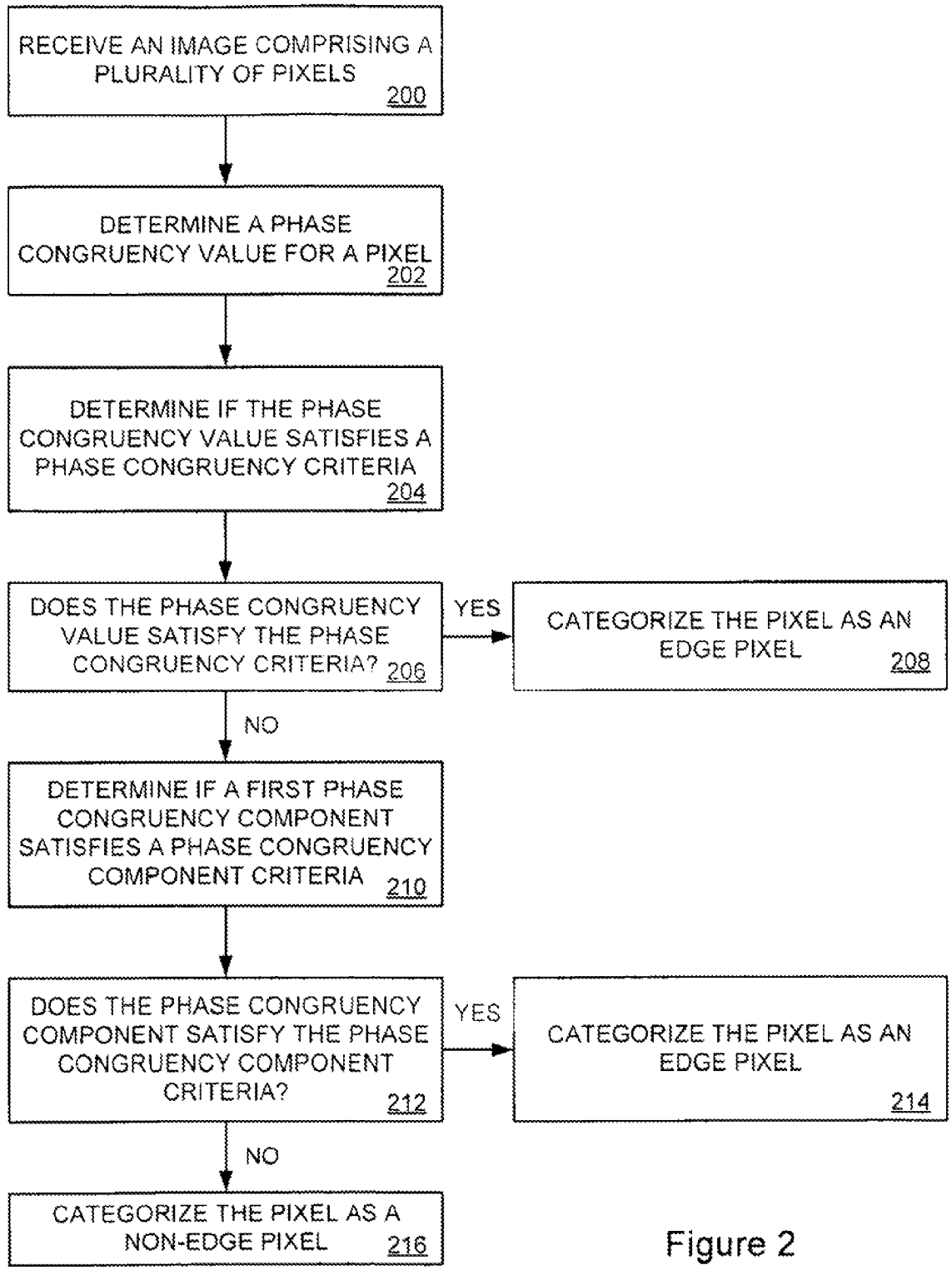
FIG. 2 is a flow diagram illustrating a method for edge detection of image data.

FIG. 2 is a flow diagram illustrating a method for edge detection of image data. Reference numbers from FIG. 2 are indicated parenthetically below. Image processing system 104 receives an image comprising a plurality of pixels, (operation 200). This image may be color or gray scale, and of any size and aspect ratio. In some embodiments the image may be a digital image of a transit system, where edge detection is used to produce edge pixels and corner pixels which define outlines of human heads. This information may be used to count people entering, leaving, and remaining on the transit system, such as passengers on a bus.

Image processing system 104 then determines a phase congruency value for a pixel, (operation 202). The phase congruency value comprises a plurality of phase congruency components. Methods for determining the phase congruency value of a pixel are illustrated in FIGS. 4-7 and described below.

Image processing system 104 determines if the phase congruency value satisfies a phase congruency criteria, (operation 204). This phase congruency criteria may be defined using any of a wide variety of methods. For example, since phase congruency values are between 0.0 and 1.0, a fixed phase congruency threshold value may be set such that phase congruency values greater than the threshold value satisfy the criteria, while phase congruency values less than the threshold value fail the criteria. In other embodiments the threshold value may be calculated based on the average phase congruency of the image. Still other embodiments may allow a user to set the phase congruency threshold value.

Figure 4:
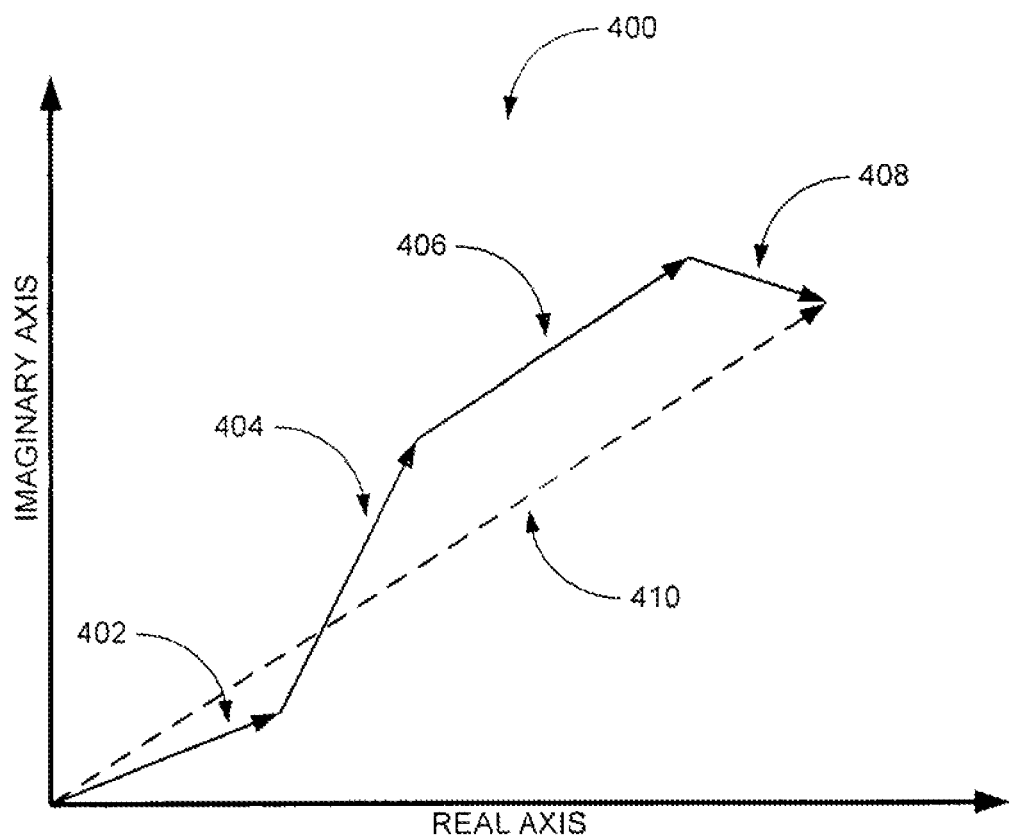
FIG. 4 is an illustration of a method for calculating phase congruency for a pixel from a plurality of Fourier components.

If the phase congruency value satisfies the phase congruency criteria, (operation 206), image processing system 104 categorizes the pixel as an edge pixel, (operation 208). If the phase congruency value does not satisfy the phase congruency criteria, (operation 206), image processing system 104 compares a first phase congruency component of the plurality of phase congruency components to a phase congruency component criteria, (operation 210). In some embodiments the phase congruency value may be the ratio of the first phase congruency component to a second phase congruency component. This example is illustrated in FIG. 4, and described below. In such an example, the first phase congruency component is a measurement of local energy at the pixel, while the second phase congruency component is a sum of amplitudes of Fourier components of the image at the pixel. In some embodiments a fixed phase congruency component threshold value may be set such that phase congruency component values greater than the threshold value satisfy the criteria, while phase congruency component values less than the threshold value fail the criteria. In other embodiments the threshold value may be calculated based on the average energy of the image. Still other embodiments may allow a user to set the phase congruency component threshold value.

If the first phase congruency component satisfies the phase congruency component criteria, (operation 212), image processing system 104 categorizes the pixel as an edge pixel, (operation 214). If the first phase congruency component does not satisfy the phase congruency component criteria, (operation 212), image processing system 104 categorizes the pixel as a non-edge pixel, (operation 216). Operations 210-216 act as a method for applying hysteresis to the edges detected in the image. In an embodiment, pixels having a local energy greater than a phase congruency component threshold value are categorized as edge pixels in addition to the pixels having a phase congruency value satisfying the phase congruency criteria. This allows for pixels that fail the phase congruency test, to be counted as edge pixels if their local energy satisfies the phase congruency component criteria.

Figure 3:
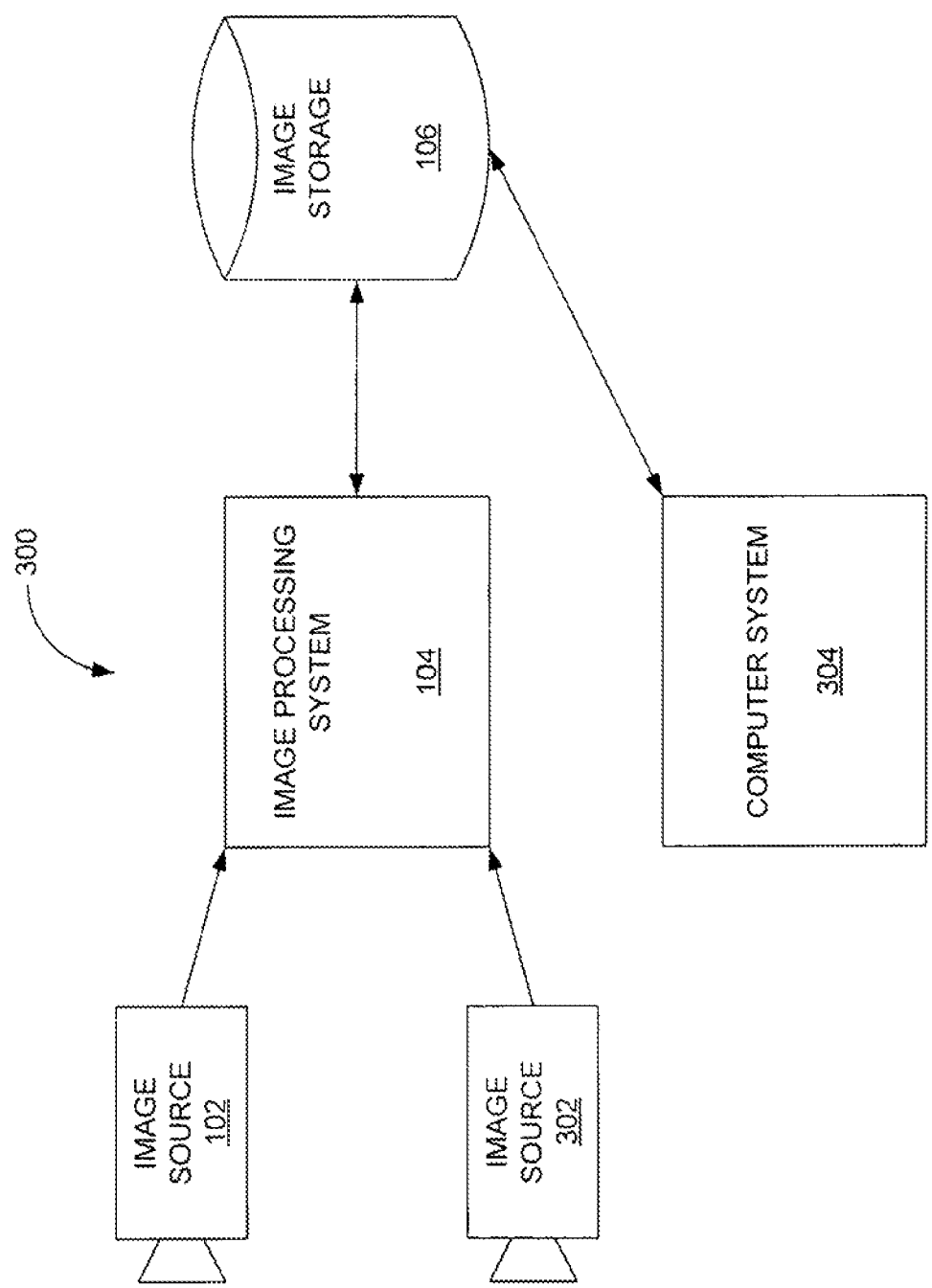
FIG. 3 is a block diagram illustrating an image system for edge detection.

FIG. 3 is a block diagram illustrating an image system 300 for edge detection. Similar to the image system 100 illustrated in FIG. 1, image processing system 104 is coupled with image source 102, and image storage 106. This example also includes image source 302 also coupled with image processing system 104 and computer system 304 coupled with image storage 106. Image system 300 illustrates the fact that images may be captured by a plurality of image sources, in a variety of image formats. Further, an external computer system 304 may be used to view raw images and enhanced edge images produced by the method described herein.

FIG. 4 is an illustration of a method for calculating phase congruency for a pixel from a plurality of Fourier components. In this example phase congruency graph 400, four Fourier components are represented as vectors (402, 404, 406, and 408) which are summed to create a local energy vector 410. Each vector has a magnitude and phase angle. While this example includes four Fourier components, other examples may use any number of Fourier components in calculating phase congruency. In some embodiments, phase congruency may be calculated by dividing the magnitude of the local energy vector by the sum of the magnitudes of the Fourier component vectors. When all the Fourier components are exactly in phase the magnitude of the local energy vector will be equal to the sum of the magnitudes of the Fourier component vectors, and the resulting phase congruency will be equal to 1.0. As the Fourier components become out of phase with each other the phase congruency will approach 0.0. Other embodiments may use other methods to calculate phase congruency from the Fourier components.

Figure 5:
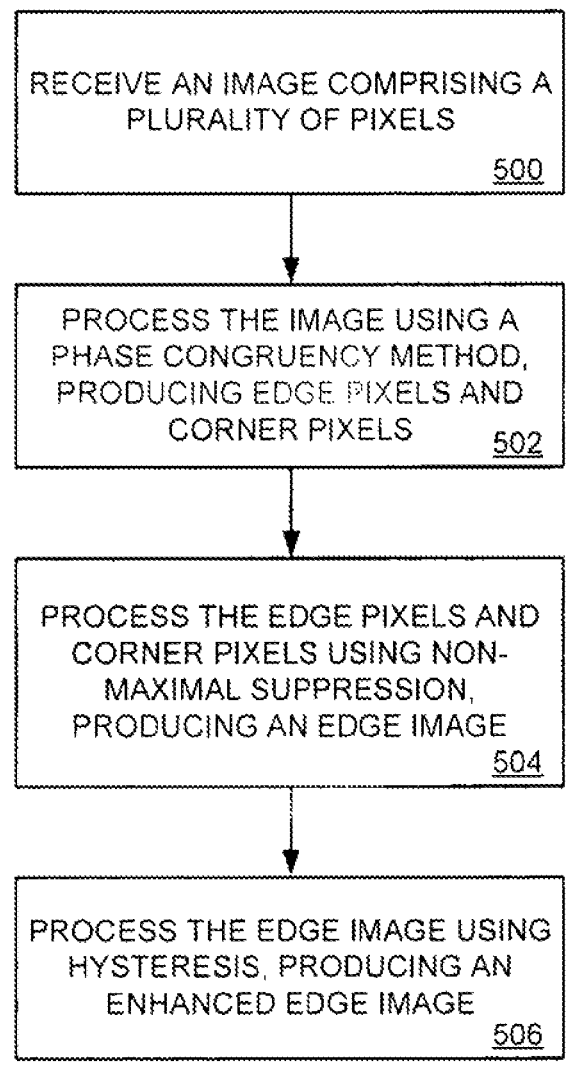
FIG. 5 is a flow diagram illustrating a method for edge detection of image data.

FIG. 5 is a flow diagram illustrating a method for edge detection of image data. Reference numbers from FIG. 5 are indicated parenthetically below. Image processing system 104 receives an image comprising a plurality of pixels (operation 500). This image may be color or gray scale, and of any size and aspect ratio. In some embodiments the image may be a digital image of a transit system, where edge detection is used to produce edge pixels and corner pixels which define outlines of human heads. This information may be used to count people entering, leaving, and remaining on the transit system, such as passengers on a bus.

Image processing system 104 then processes the image using a phase congruency method, producing a list of edge pixels, and a list of corner pixels (operation 502). Phase congruency operates by examining the Fourier components of an image and noting the locations where the Fourier components are maximally in phase. By examining the Fourier components of an image instead of the intensity of the pixels within the image, phase congruency provides edge detection for images with minimal sensitivity to the contrast or brightness of the images. For example, very dark images with little dynamic range make ordinary edge detection difficult since there may not be any large variations in intensity at an objects edge. Images with very low contrast also present similar difficulties.

Figure 6:
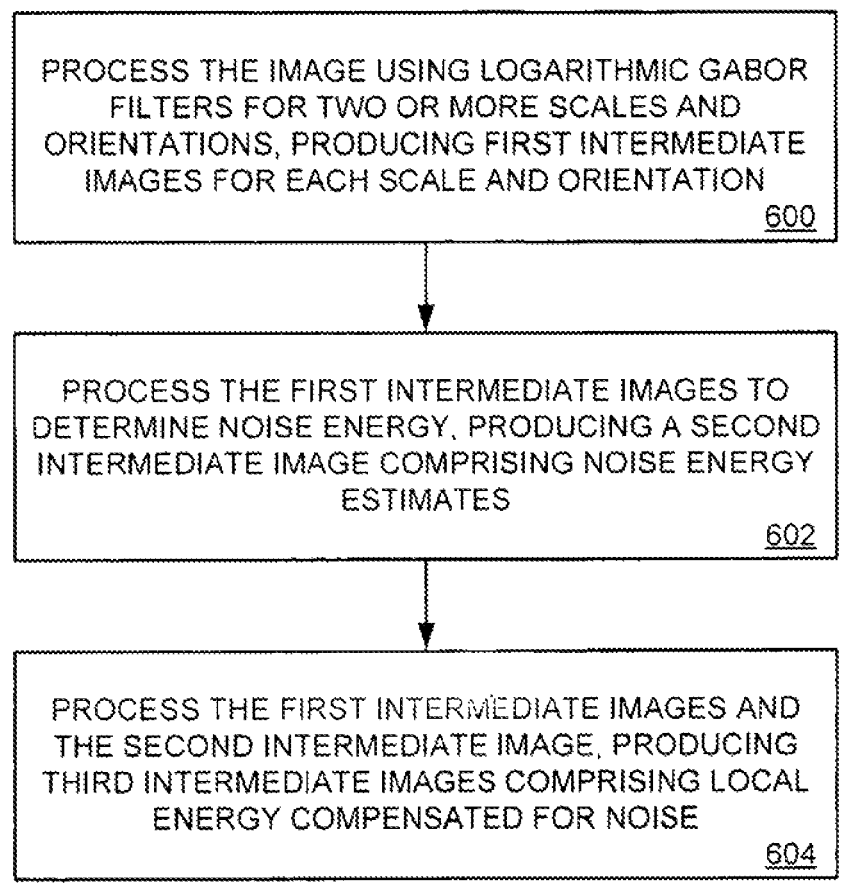
FIG. 6 is a flow diagram illustrating a method for edge detection of image data.

Phase congruency methods are relatively insensitive to the brightness and contrast of an image since they process the frequency components of the image, searching for points where the phases of the various frequency components are aligned. Fourier transforms, or the equivalent, are used to generate a plurality of frequency components of the image. Further description of an example phase congruency method is illustrated in FIG. 6 and described below. The result of processing an image using a phase congruency method is a list of edge pixels and a list of corner pixels.

Next, image processing system 104 processes the edge pixels and corner pixels using non-maximal suppression, resulting in an edge image (operation 504). Given a list of corner pixels and edge pixels, local maxima pixels between the corner pixels are kept as edge pixels, and non-maxima pixels are suppressed. Each edge point is examined to find those edge pixels with energy representing local maxima in a direction perpendicular to the edge direction. All other edge pixels are discarded.

Finally, image processing system 104 processes the edge image using hysteresis, resulting in an enhanced edge image (operation 506). Hysteresis is performed by searching for pixels in an edge direction which are not currently marked as edge pixels, but having energy greater than a hysteresis threshold. These pixels are then also marked as edge pixels. The addition of these hysteresis edge pixels to the edge image resulting from the non-maximal suppression method, results in an enhanced edge image.

The resulting enhanced edge image may then be used by a variety of image processing systems to produce any of a wide variety of image processing results. For example, some systems may use the enhanced edge image for face or head detection, image content analysis, or any other image process.

FIG. 6 is a flow diagram illustrating a method for edge detection of image data. Reference numbers from FIG. 6 are indicated parenthetically below. This flow diagram details a method for determining the phase congruency of a pixel in an image such as that shown in operation 202 from FIG. 2. Image processing system 104 processes the image using logarithmic Gabor filters for two or more scales and orientations, resulting in first intermediate images for each scale and orientation, (operation 600). A wide variety of different scales and orientations may be used to adequately process the image. Some embodiments use six different orientations with four scales, while other embodiments may use different orientations and scales. The logarithmic Gabor filters may be convolved with the image for all scales and orientations by multiplication in the frequency domain and then by inverse Fast Fourier Transform (FFT). The logarithmic Gabor filters may have a transfer function of:

$$G(\omega) = \frac{\exp(-(\log(\omega/\omega_0)))}{2(\log(\kappa/\omega_0))^2}$$

where $\omega$ is frequency, $\omega_0$ is a filter center frequency, and $\kappa$ is a scale factor.

Next, image processing system 104 processes the first intermediate images to determine noise energy, resulting in a second intermediate image comprising noise energy estimates, (operation 602). Noise energy may be determined using any of a wide variety of methods. In an example, the noise power may be estimated from the energy squared response at the smallest scale. The median energy squared response is calculated, and from this the mean noise energy may be estimated.

Image processing system 104 then processes the first intermediate images and the second intermediate image (which comprises noise energy estimates), resulting in third intermediate images comprising local energy compensated for noise, (operation 604). In some embodiments, this operation may be performed simply by subtracting the noise energy estimates (second intermediate image) from each of the first intermediate images to produce the third intermediate images.

Figure 7:
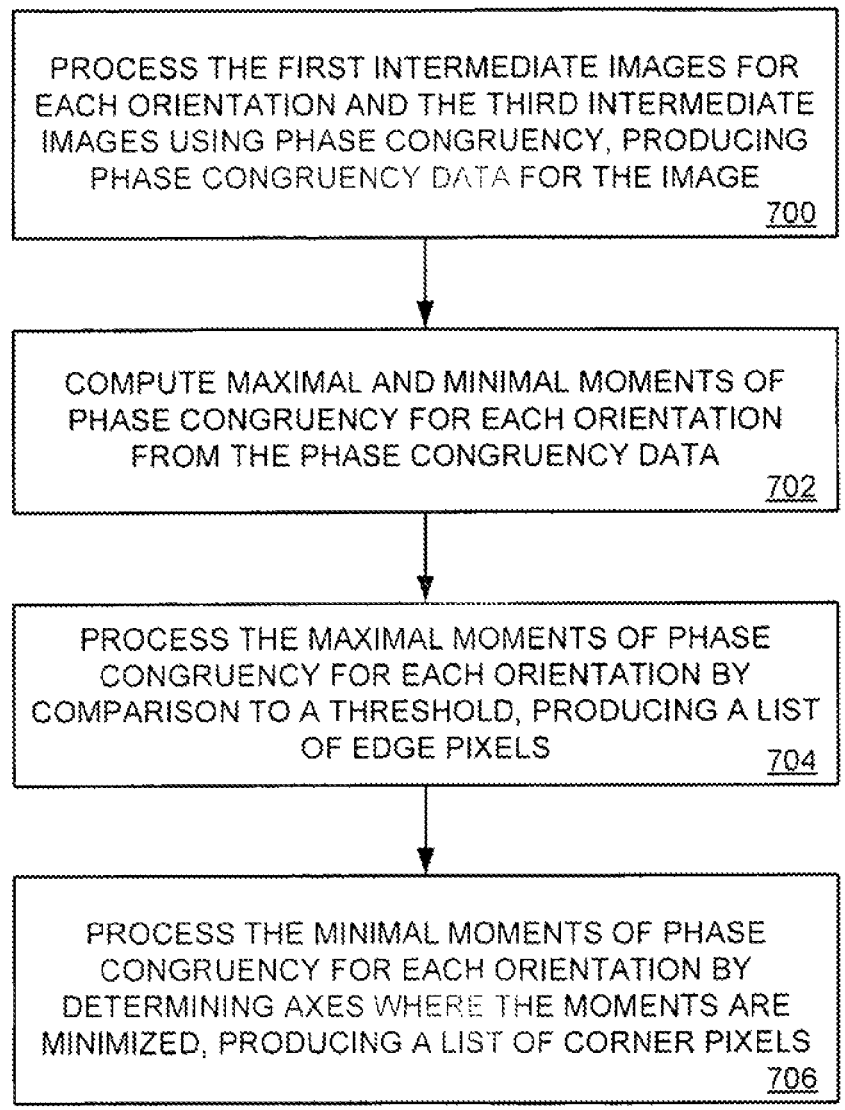
FIG. 7 is a flow diagram illustrating a method for edge detection of image data.

FIG. 7 is a flow diagram illustrating a method for edge detection of image data. Reference numbers from FIG. 7 are indicated parenthetically below. This flow diagram further illustrates the method of processing the image using a phase congruency method.

Image processing system 104 processes the first intermediate images for each orientation and the third intermediate images using phase congruency, resulting in phase congruency data for the image, (operation 700). Phase congruency for each pixel may be calculated geometrically by determining the amplitude and phase angle of each Fourier component at the current pixel. Thus each Fourier component may be represented by a vector having an amplitude and phase angle. These vectors may then be summed into a local energy vector having a magnitude (representing the local energy of the pixel) and a phase angle. The phase angle is irrelevant to phase congruency computations since the method looks for pixels where the Fourier components are in phase with each other regardless of what that actual phase angle may be. Phase congruency may be calculated as the ratio of the magnitude of the local energy vector to the sum of the amplitudes of the vectors for each Fourier component. This calculation is illustrated in FIG. 4, and described above.

Next, image processing system 104 computes maximal and minimal moments of phase congruency for each orientation from the phase congruency data, (operation 702). This operation examines the frequency response of the image along each orientation for pixels where the various frequency components are in phase. Pixels where most or all of the frequency components of the image (maximal moment of phase congruency) along the orientation most likely represent a pixel along an edge that is at least somewhat perpendicular to the current orientation.

Image processing system 104 compares the maximal moments of phase congruency for each orientation to a threshold, resulting in a list of edge pixels, (operation 704). Pixels where the phases of the Fourier components are in phase will have maximal moments of phase congruency, and these pixels will be selected as edge pixels.

Image processing system 104 also processes the minimal moments of phase congruency for each orientation by determining axes of orientation where the moments are minimized, resulting in a list of corner pixels, (operation 706).

The methods, systems, devices, processors, equipment, and servers described above may be implemented with, contain, or be executed by one or more computer systems. The methods described above may also be stored on a computer readable medium for execution by a computer system. Many of the elements of image system 300 may be, comprise, or include computer systems. This includes, but is not limited to image processing system 104, image storage 106, and computer system 304. These computer systems are illustrated, by way of example, in FIG. 8.

Figure 8:
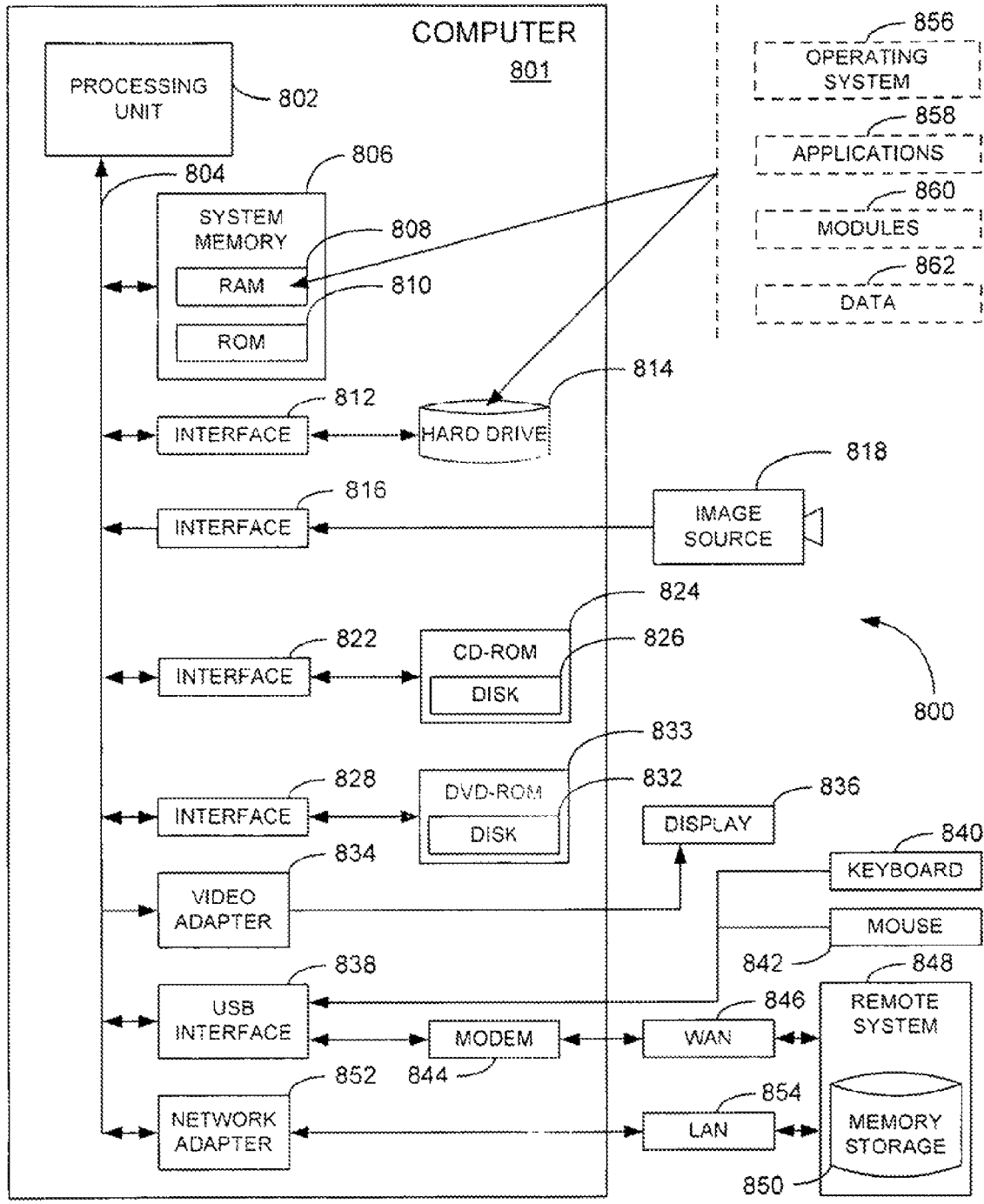
FIG. 8 is a block diagram illustrating a computer system including a computer configured to process images in order to detect edges.

FIG. 8 is a block diagram illustrating a computer system 800 including a computer 801 configured to operate as a image processing system 104, such as that illustrated in FIGS. 1 and 3. Computer system 800 includes computer 801 which in turn includes processing unit 802, system memory 806, and system bus 804 that couples various system components including system memory 806 to processing unit 802. Processing unit 802 may be any of a wide variety of processors or logic circuits, including the Intel X86 series, Pentium, Itanium, and other devices from a wide variety of vendors. Processing unit 802 may include a single processor, a dual-core processor, a quad-core processor or any other configuration of processors, all within the scope of the present invention. Computer 801 could be comprised of a programmed general-purpose computer, although those skilled in the art will appreciate that programmable or special purpose circuitry and equipment may be used. Computer system 800 may be distributed among multiple devices that together comprise elements 802-862.

There are a wide variety of system bus 804 architectures, such as PCI, VESA, Microchannel, ISA, and EISA, available for use within computer 801, and in some embodiments multiple system buses may be used within computer 801. System memory 806 includes random access memory (RAM) 808, and read only memory (ROM) 810. System ROM 810 may include a basic input/output system (BIOS), which contains low-level routines used in transferring data between different elements within the computer, particularly during start-up of the computer. System memory 806 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, system memory 806 may incorporate electronic, magnetic, optical, and/or other types of storage media. Note that system memory 806 can have a distributed architecture, where various components are situated remote from one another, but can be accessed by processing unit 802.

Processing unit 802 receives software instructions from system memory 806 or other storage elements and executes these instructions directing processing unit 802 to operate in a method as described herein. These software instructions may include operating system 856, applications 858, modules 860, utilities, drivers, networking software, and data 862. Software may comprise firmware, or some other form of machine-readable processing instructions.

Computer 801 also includes hard drive 814 coupled to system bus 804 through hard drive interface 812, CD-ROM drive 824 containing CD-ROM disk 826 coupled to system bus 804 through CD-ROM drive interface 822, and DVD-ROM drive 833 containing DVD-ROM disk 832 coupled to system bus 804 through DVD-ROM drive interface 828. There are a wide variety of other storage elements, such as flash memory cards and tape drives, available for inclusion in computer 801, which may be coupled to system bus 804 through a wide variety of interfaces. Also, these storage elements may be distributed among multiple devices, as shown here, and also may situated remote from each other, but can be accessed by processing unit 802.

Computer 801 further includes image interface 822 coupled to processing unit 802 through system bus 804, configured to receive video data or image data from an image source 824. Image source 824 may be any combination of digital cameras, video cameras, video players, video recorders, or any other devices capable of transmitting image data to computer 801. Image source 824 may correspond to image sources 102 and 302 shown in FIGS. 1 and 3.

Computer 801 also includes video adaptor 834 configured to drive display 836, and universal serial bus (USB) interface 838 configured to receive user inputs from keyboard 840 and mouse 842. Other user interfaces could comprise a voice recognition interface, microphone and speakers, graphical display, touch screen, game pad, scanner, printer, or some other type of user device. These user interfaces may be distributed among multiple user devices. USB interface 838 is also configured to interface with modem 844 allowing communication with remote system 848 through a wide area network (WAN) 846, such as the internet. USB interface 838 and network adaptor 852 may be configured to operate as input ports capable of receiving image data from image storage 106 and as output ports to store image data to image storage 106.

Computer 801 further includes network adaptor 852 configured to communicate to remote system 848 through a local area network (LAN) 845. There are a wide variety of network adaptors 852 and network configurations available to allow communication with remote systems 848, and any may be used in other embodiments. For example, networks may include Ethernet connections or wireless connections. Networks may be local to a single office or site, or may be as broad and inclusive as the Internet or Usenet. Remote systems 848 may include memory storage 850 in a very wide variety of configurations.

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computer system for edge detection, the method comprising:

receiving a plurality of images, each image of the plurality comprising a plurality of pixels;

determining a phase congruency value for each pixel of the plurality based upon at least a first phase congruency component;

producing a list of edge pixels from the determined phase congruency values;

producing a list of corner pixels from the determined phase congruency values;

producing an edge image from the list of edge pixels and list of corner pixels using non-maximal suppression, wherein:

the non-maximal suppression comprises identifying local maxima pixels between identified corner pixels as selected edge pixels and discarding all other edge pixels; and the edge image is constructed from the selected edge pixels;

producing an enhanced edge image by processing the edge image using hysteresis, wherein:

using hysteresis comprises comparing an energy of the pixels in an edge direction which are not in the edge image to a hysteresis threshold, identifying those pixels with energy greater than the hysteresis threshold as new edge pixels, and adding the new edge pixels to the edge image to produce the enhanced edge image; and applying an object detection algorithm to the enhanced edge image to identify at least one object in the plurality of images.

2. A non-transitory computer-readable medium having instructions stored thereon for operating a computer system to detect edges, wherein the instructions, when executed by the computer system, direct the computer system to:

receive a plurality of images, each image of the plurality comprising a plurality of pixels;

determine a phase congruency value for each pixel of the plurality based upon at least a first phase congruency component;

produce a list of edge pixels from the determined phase congruency values;

produce a list of corner pixels from the determined phase congruency values;

produce an edge image from the list of edge pixels and list of corner pixels using non-maximal suppression, wherein:

the non-maximal suppression comprises identifying local maxima pixels between identified corner pixels as selected edge pixels and discarding all other edge pixels; and the edge image is constructed from the selected edge pixels;

produce an enhanced edge image by processing the edge image using hysteresis, wherein:

using hysteresis comprises comparing an energy of the pixels in an edge direction which are not in the edge image to a hysteresis threshold, identifying those pixels with energy greater than the hysteresis threshold as new edge pixels, and adding the new edge pixels to the edge image to produce the enhanced edge image; and apply an object detection algorithm to the enhanced edge image to identify at least one object in the plurality of images.

* * * * *